US011252471B2

(12) United States Patent
Leduby et al.

(10) Patent No.: US 11,252,471 B2
(45) Date of Patent: Feb. 15, 2022

(54) METHOD FOR MANAGING THE ELECTRICITY CONSUMPTION OF AN ELECTRONIC DEVICE

(71) Applicant: ORANGE, Paris (FR)

(72) Inventors: Jean-Bernard Leduby, Chatillon (FR); Martin Conan, Chatillon (FR)

(73) Assignee: ORANGE, Issy-les-Moulineaux (CN)

( * ) Notice: Subject to any disclaimer, the term of this patent is extended or adjusted under 35 U.S.C. 154(b) by 0 days.

(21) Appl. No.: 16/209,189

(22) Filed: Dec. 4, 2018

(65) Prior Publication Data
US 2019/0174185 A1 Jun. 6, 2019

(30) Foreign Application Priority Data
Dec. 5, 2017 (FR) ...................................... 1761620

(51) Int. Cl.
H04N 21/442 (2011.01)
H04N 21/462 (2011.01)
H04N 19/14 (2014.01)
H04N 19/102 (2014.01)
H04N 21/45 (2011.01)
(Continued)

(52) U.S. Cl.
CPC ....... H04N 21/4424 (2013.01); H04N 19/102 (2014.11); H04N 19/14 (2014.11); H04N 21/23439 (2013.01); H04N 21/4436 (2013.01); H04N 21/4516 (2013.01); H04N 21/4621 (2013.01)

(58) Field of Classification Search
CPC .......... H04N 21/4424; H04N 21/4436; H04N 21/23439; H04N 21/4516; H04N 19/102; H04N 19/14; H04N 21/4621
See application file for complete search history.

(56) References Cited

U.S. PATENT DOCUMENTS 9,106,887 B1 * 8/2015 Owen ..................... H04L 41/22
10,097,889 B2 * 10/2018 Ducloux .......... H04N 21/23439
10,484,446 B1 * 11/2019 Waggoner ............... H04L 47/38
(Continued)

FOREIGN PATENT DOCUMENTS

WO 2014138331 A2 9/2014
WO 2015007868 A1 1/2015
WO 2016105812 A1 6/2016

OTHER PUBLICATIONS

French Search Report and Written Opinion dated Aug. 17, 2018 for corresponding French Application No. 1761620, filed Dec. 5, 2017.
(Continued)

Primary Examiner — Javier O Guzman
(74) Attorney, Agent, or Firm — David D. Brush; Westman, Champlin & Koehler, P.A.

(57) ABSTRACT

A method for managing consumption of a device for processing multimedia content. The method includes the following acts executed on the processing device: receiving a request for processing a multimedia content; analyzing the request in order to extract from it at least one rendering quality of the content; obtaining a power supply state of the device; checking the match between the quality of the content and the power supply state of the device; on the basis of the results of the check, modifying a rendering quality for the content; and processing the multimedia content in order to render it in the quality.

18 Claims, 2 Drawing Sheets

(51) Int. Cl.
*H04N 21/2343* (2011.01)
*H04N 21/443* (2011.01)

(56) References Cited

U.S. PATENT DOCUMENTS

| | | | | |
|---|---|---|---|---|
| 2006/0039469 | A1* | 2/2006 | Leibbrandt | H04N 21/4334 375/240.08 |
| 2009/0089849 | A1* | 4/2009 | Jefremov | H04N 7/148 725/118 |
| 2009/0232480 | A1* | 9/2009 | Jendbro | H04N 21/41407 386/224 |
| 2009/0313484 | A1* | 12/2009 | Millet | G06F 1/3203 713/300 |
| 2011/0268425 | A1* | 11/2011 | Glen | H04N 19/44 386/272 |
| 2012/0082209 | A1* | 4/2012 | Li | H04N 19/61 375/240.02 |
| 2013/0017815 | A1* | 1/2013 | Damola | H04W 52/0222 455/418 |
| 2013/0044264 | A1* | 2/2013 | Hymel | H04B 1/1027 348/725 |
| 2013/0080663 | A1* | 3/2013 | Rabii | G09G 5/006 710/16 |
| 2013/0290993 | A1* | 10/2013 | Cheung | H04N 21/4143 725/10 |
| 2014/0177730 | A1* | 6/2014 | Chang | H04N 19/182 375/240.25 |
| 2015/0029394 | A1* | 1/2015 | Fernandes | H04N 21/41407 348/468 |
| 2016/0057489 | A1* | 2/2016 | He | H04N 21/8456 725/14 |
| 2016/0234549 | A1* | 8/2016 | Ducloux | H04N 21/23439 |
| 2017/0078676 | A1* | 3/2017 | Coward | H04N 19/115 |
| 2017/0269664 | A1* | 9/2017 | Garner | H04N 21/4882 |
| 2018/0062389 | A1* | 3/2018 | Hashimoto | H02J 3/381 |
| 2019/0014388 | A1* | 1/2019 | Rutledge | H04N 21/6379 |

OTHER PUBLICATIONS

Anonymous, "How to stop an iPhone from automatically downloading an iOS update when on wifi and charging—Quora", Jan. 1, 2016 (Jan. 1, 2016), pp. 1-5, XP55496134.

English Translation of French Search Report and Written Opinion dated Aug. 17, 2018 for corresponding French Application No. 1761620, filed Dec. 5, 2017.

Xavier Ducloux et al., "Thomson Video Networks 'Response to the Call for Proposals on Green MPEG'", 105. MPEG Meeting; Jul. 29, 2013-Aug. 2, 2013; Vienna; (Motion Picture Expert Group or ISO/IEC JTC1/SC29/WG11),, No. m30507, Jul. 28, 2013 (Jul. 28, 2013), XP030059034.

Anonymous, "Current Battery State Always Returning 'Charging in IOS'", Jan. 1, 2014 (Jan. 1, 2014_, XP55496155.

* cited by examiner

METHOD FOR MANAGING THE ELECTRICITY CONSUMPTION OF AN ELECTRONIC DEVICE

TECHNICAL FIELD

The invention relates to a system and a method for managing the electricity consumption of an electronic device.

The invention is applicable to any device having an electrical power supply source. It is particularly intended for multimedia devices.

PRIOR ART

The electrical energy consumption of an electronic device (a video decoder, a smartphone, or the like) usually depends on the modules and/or applications used at a given instant on such a device. The electricity consumption of a multimedia decoder may, for example, vary according to the type and resolution of the decoded multimedia content, its requirements for transmission/reception over a network, the type of calculations that it must perform, etc.

A user of such a device cannot, therefore, know a priori whether the electrical resources of his device, notably the type, the power and possibly the duration of power supply, are sufficient for the required processing.

Thus the device will fail to provide the expected application if the battery is insufficiently charged, or if the device is not connected correctly; notably, it may not render the content, or may render it incorrectly, or may stop during the moving of the content.

The invention offers a solution which does not have the drawbacks of the prior art.

THE INVENTION

For this purpose, according to a functional aspect, the object of the invention is a method for managing the consumption of a device for processing multimedia content, said method being characterized in that it includes, executed on the processing device, the steps of:
  receiving a request for processing a multimedia content;
  analysing the request in order to extract from it at least one rendering quality of said content;
  obtaining a power supply state of the device;
  checking the match between said quality of the content and the power supply state of the device;
  on the basis of the results of the check, modifying the rendering quality for said content;
  processing the multimedia content in order to render it in said quality.

"Multimedia content" is taken to mean a content that may contain one or more media (audio, video, graphics, text, sound, etc.) with which are associated media characteristics (spatial or temporal resolution, speed, frequency, sampling, coding type, coding format, etc.).

The "rendering quality" of the multimedia content is taken to mean a certain resolution of the digital content (spatial or temporal resolution, quality level associated with the video and/or audio compression) at a certain speed. Conventionally, different qualities may be encoded for the same content of a sequence, corresponding to different speeds, for example. For example, in an adaptive streaming context, a content is offered in time segments (or fragments) of different quality levels. A quality therefore corresponds to a certain level offered. For the device, a quality corresponds to a certain level of complexity of the processing (acquisition, decoding, etc.). Depending on this quality, therefore, a greater or lesser amount of power, and therefore of energy supply, is required.

"Processing of the multimedia content" is taken to mean the acquisition and decoding of the content for the purpose of its rendering. The rendering may be visual (display) or audible, etc. It may be executed on the processing device or on an external device.

The "power supply state" of the device is taken to mean the type of the power supply (mains, battery, serial, etc.) and/or its available power (serial/mains charging power, remaining charge of the battery or of any other type of power supply with a finite duration, etc.).

Thus the invention has the advantage of being able to automatically match the quality of the content, and hence the complexity associated with its processing, to the power supply of the device. This is because, if the complexity of the processing of the content is too great, some types of power supply may be inadequate (inadequate battery, USB charging power too limited, inadequate mains connection, etc.). In such a case, the method according to the invention selects a content having different characteristics, and therefore a different quality, usually in such a way that it can be processed with a degree of complexity corresponding to the available power supply. Advantageously, the user may thus enjoy the content regardless of the power supply mode and state of the device.

According to a particular embodiment of the invention, a method as described above is characterized in that the device is powered by a power supply having a finite duration, and in that it further includes the following steps executed on the device:
  obtaining the desired duration of the rendering of the content;
  obtaining the residual charge of the power supply;
  calculating the possible duration of rendering on the basis of the residual charge of the power supply and the quality of the content;
  comparing the possible duration of rendering with the desired duration of rendering;
and in that
  the new rendering quality of said content is calculated in such a way that the possible duration of rendering is at least equal to the desired duration of rendering.

"Power supply with a finite duration" is taken to mean a power supply whose duration is limited in time, and whose total power, or rendering charge, is therefore also limited, by contrast with a power supply with an unlimited duration, for example a mains connection which is not time-limited, and is consequently not limited in its total power. It may typically is a battery or a power supply which is time-limited because of application-specific requirements (parental control, parameterizable access of applications to electricity consumption on a smartphone-type device, etc.).

Thus this embodiment of the invention offers the advantage of being able to adapt the quality/complexity of the content automatically to a power supply of the device having a finite duration, in order to render the whole of a content. This is because, if the possible duration of rendering calculated on the basis of the residual charge of the battery is shorter than the desired duration of rendering, the method according to the invention selects a content having different characteristics, so that it can be played to the end without interruption. Advantageously, the user may thus enjoy the whole of the content.

According to a second particular embodiment of the invention, which may be used as an alternative, or in addition, to the preceding one, such a method is characterized in that the rendering quality of the content is linked to a characteristic of coding, of speed or of resolution.

This embodiment of the invention enables a new quality to be selected for the content according to one or more criteria relating to said content; in fact, a number of criteria may affect the complexity of the decoding of the content, and therefore the power required for decoding.

According to another particular embodiment of the invention, which may be used as an alternative, or in addition, to the preceding ones, such a method is characterized in that the request is a request for progressive downloading of a multimedia content described in a description file offering at least two quality levels for the content, and in that the step of modifying the rendering quality of said content includes a sub-step of selecting a quality level from said description file.

Advantageously, this embodiment of the invention makes it possible to use the mechanisms provided by adaptive streaming techniques. For accessing a multimedia content by streaming on a network, there are a number of technical solutions, for example the proprietary solutions Microsoft Smooth Streaming, Apple HLS, Adobe Http Dynamic Streaming, or the MPEG-DASH standard of the ISO/IEC organization, which will be described hereafter. The client terminal usually makes a request in two steps: a first step consists in downloading a document describing the parameters for access to the service via the HTTP (HyperText Transfer Protocol), a client-server communication protocol developed for internet networks and particularly the Web. This document contains a set of information describing the content that may be accessed at a certain address on a content server. This is referred to below by the expression "description file" and, for the sake of simplicity, it is assumed to be located on the same server (3) as the content. Conventionally, this file "exhibits" different flows for the same video, corresponding for example to different speeds, different resolutions, and different qualities. By using such a file it is advantageously possible to access rapidly the selection of a content whose quality is suitable for the power supply. In a second step, the client terminal accesses the content on the server, and the service actually commences; that is to say, the client terminal is able to receive and display the content.

According to a variant of this embodiment, such a method is characterized in that it also includes a step of entering a level of complexity into said description file.

Advantageously, this variant of the invention enables the description file to be complemented by the entry of a complexity associated with a quality level. Thus a subsequent step of selecting a content will allow the method according to the invention to rapidly discover the complexity level required for a given level, and therefore to select more rapidly the most appropriate level among a number of possible levels.

According to another variant of this embodiment, which may be implemented as an alternative to the preceding one, such a method is characterized in that it also includes a step of entering a duration of charge into said description file.

Advantageously, this variant of the invention enables the description file to be complemented by the entry of a duration of power supply (for example, the remaining charge duration of a battery) required for a quality level. Thus a subsequent step of selecting a content will allow the method according to the invention to rapidly discover the duration required for a given level, and therefore to select more rapidly the most appropriate level among a number of possible levels.

According to another particular embodiment of the invention, which may be implemented as an alternative, or in addition, to the preceding ones, such a method is characterized in that it includes the following steps executed on the device:
  obtaining a data structure representative of the power supply requirements of the device;
  reading in said structure at least one power supply state required for said at least one required content quality;
  comparing the power supply state of the device with said at least one power supply state required.

Advantageously, according to this embodiment, the device very simply accesses the power supply state required for the required quality, by reading a data structure in memory. This data structure may be a table, a file, etc., in the memory of the device. It includes a correspondence between the qualities that may be chosen for a content and the corresponding power supply state required.

According to another particular embodiment of the invention, which may be implemented as an alternative, or in addition, to the preceding ones, such a method is characterized in that the step of modifying the rendering quality of said content is followed by the transmission of a message relating to the quality of the content.

Advantageously, according to this embodiment, a terminal that has transmitted the request to the processing device (for example, a smartphone transmitting a content loading request to a TV dongle or an STB) will receive in return the message informing it of the new quality selected for the content. Since it is usually the user's terminal, the user will be able to know rapidly whether the quality selected for the content is in accordance with his wishes. Alternatively, it is the content display terminal connected to the processing device (for example, a television rendering the content streamed by a TV dongle) which will receive the message informing it of the new quality.

According to a hardware aspect, the invention also relates to a processing device capable of processing multimedia content, including:
  a module for receiving a request for processing a multimedia content;
  a module for analysing the request in order to extract from it at least one rendering quality of said content;
  a module for obtaining a power supply state of the device;
  a module for checking the match between said at least one quality of the content and the power supply state of the device;
  a module for modifying the rendering quality for said content on the basis of the results of the check;
  a module for processing the multimedia content in order to render it in said quality.

The term "module" may relate equally well to a software component or to a hardware component or a set of hardware and software components, where a software component itself corresponds to one or more computer programs or sub-programs, or more generally any element of a program capable of performing a function or a set of functions as described for the modules in question. Similarly, a hardware component corresponds to any element of a hardware assembly capable of performing a function or a set of functions for the module in question (integrated circuit, chip card, memory card, etc.).

According to another hardware aspect, the invention also relates to a digital decoder comprising such a processing device.

According to another hardware aspect, the invention also relates to a computer program that can be implemented in a processing device as defined above, the program comprising code instructions which, when the program is executed by a processor, conducts the steps of the management method described above.

The objects according to these hardware aspects of the invention provide at least the same benefits as those provided by the method according to the first aspect. The optional characteristics mentioned in relation to the first aspect may be applicable in terms of the method.

This program may use any programming language, and may be in the form of source code, object code, or code intermediate between source and object code, such as code in partially compiled form, or any other desirable form.

According to yet another hardware aspect, the invention relates to a recording medium readable by a data processor, on which is recorded a program comprising program code instructions for executing the steps of the method defined above.

The information medium may be any entity or device capable of storing the program. For example, the medium may include a storage means such as a ROM, for example a CD-ROM or a microelectronic circuit ROM, or a magnetic recording means for example a diskette or a hard disk. On the other hand, the information medium may be a transmissible medium such as an electrical or optical signal which may be routed via an electrical or optical cable, by radio or by other means. The program according to the invention can, in particular, be downloaded from a network such as the Internet. Alternatively, the information medium may be an integrated circuit in which the program is incorporated, the circuit being adapted to execute the method in question or to be used in its execution.

The invention will be more readily understood from a perusal of the following description, provided by way of example, with reference to the appended drawings.

THE FIGURES

DETAILED DESCRIPTION OF AN EXAMPLE EMBODIMENT ILLUSTRATING THE INVENTION

Figure 1:
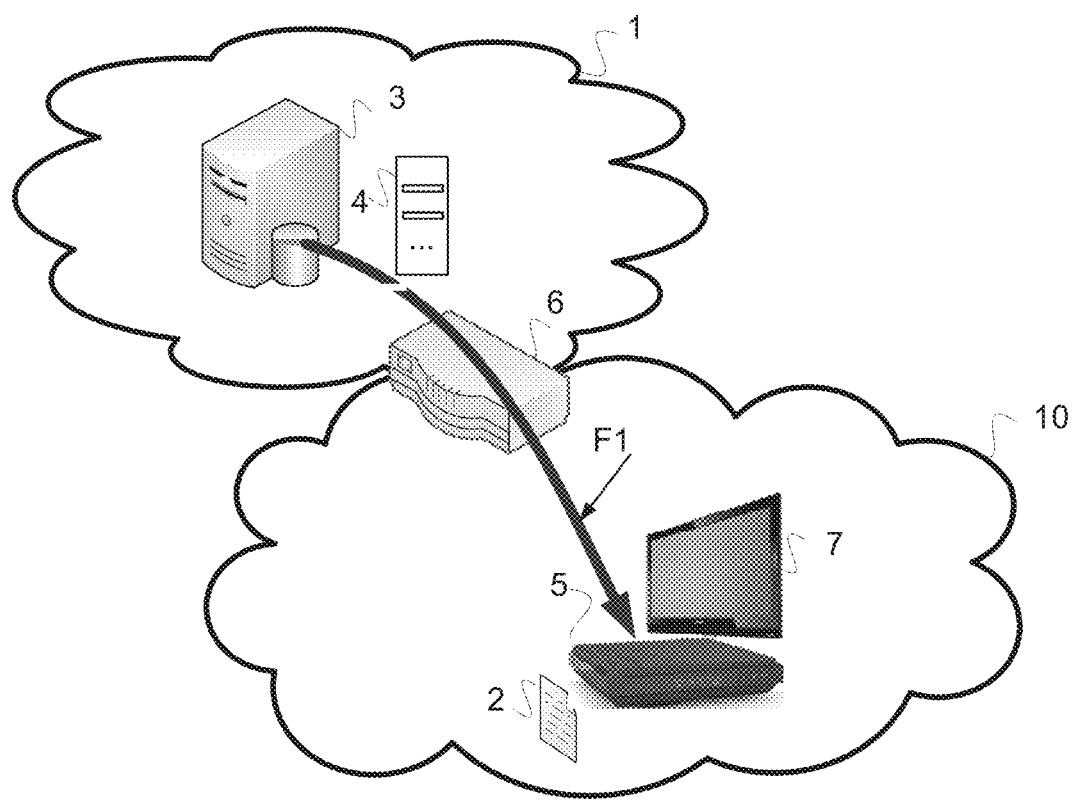
FIG. 1 shows an embodiment of the invention in which the processing device is a digital decoder.

FIG. 1 shows an embodiment of the invention in which the processing device (5) is a digital decoder that wishes to access a multimedia content in adaptive streaming mode.

The digital decoder is provided by way of example. It may take the form of a set-top box (STB), a portable decoder or a TV dongle, that is to say a portable streaming device. It may also take the form of a device capable of processing (decoding, rendering, etc.) a multimedia content, for example a smartphone or an electronic tablet.

According to this example, the device is in a local network (10) connected to the wide area network (WAN, 1) via a service gateway (6) which redirects, or routes, data packets among the various terminals and networks connected to it. Such a local network commonly connects the various terminals using wireless (WiFi) or wired technology. In the following text, "processing device" is taken to mean a terminal capable of connecting in a wired or wireless manner to the gateway (6) for processing a multimedia content. The context of the local home network (10) is given by way of example, and could easily be transposed to that of a corporate network.

The local network (10) according to this embodiment of the invention comprises the processing device (5) and a rendering device (7), or more simply television (TV), associated with the decoder (5) connected to the local network (10) via the service gateway (6) responsible for downloading the content on the WAN network (1). The network (10) is, for example, an IP (Internet Protocol) local network and the WAN network (1) is also of the IP type and contains multimedia content servers (3) which host, notably, digital content to be made available to the terminals of the local network (10) in streaming mode. The content server (3) in this example is located in the WAN (1) but it could, in another example, be located in a local network, for example at the service gateway (6) or at any other device capable of hosting such a content server.

The processing device according to this embodiment of the invention may be powered in a number of ways: by a serial power supply (USB), by a battery (BATT) or by a mains power supply (SEC). Evidently, other types of power supply could be envisaged without departing from the scope of the invention.

The decoder is adapted to receive this digital content in the form of multimedia data, and to render it. This rendering consists in supplying the TV with the digital content in a user-accessible form. For example, received data corresponding to a video are usually decoded, then rendered at the TV in the form of a display or viewing of the corresponding video with its associated soundtrack. In the following text, the digital content is considered to be a video and the rendering by the decoder is considered to be a viewing on the TV screen.

The content may, for example, be chosen by a user on a terminal (not shown), a smartphone or an electronic tablet for example, capable of transmitting to the decoder a downloading order comprising a downloading address to be sent to the content server (3). In this way the user decides to receive the content (C) in streaming mode. The decoder (5) then transmits a request to a server (3), stating the chosen content, and receives in return a digital data flow relating to this content. Such a content may typically be a film, a video, a sequence of content, or more generally any type of digital content that can be transmitted in the network in question. In FIG. 1, the solid arrow (F1) represents the path of a content from the content server (3) to the decoder (5).

To access the multimedia content by streaming on a network, the decoder uses, in this example, a solution based on the MPEG-DASH standard. An example of such a description file, a manifest file (abbreviated to MPD) based on this standard, is given in Appendix 1. For further details, the latest version of the ISO/IEC 23009-1 standard may be consulted. This simplified manifest file describes digital content in an XML ("eXtended Markup Language") syntax, comprising a list of content in the form of fragments conventionally described between an opening tag (< >) and a closing tag </>. Each fragment corresponds to a certain duration, with a plurality of quality levels. The following tags are particularly useful for this embodiment of the invention:
- Period duration indicates the duration (and possibly the speed) of a content;
- Adaptation Set contains the description of a multimedia flow (for example, the whole video, part of the video, the audio in a certain language, the subtitles, etc.); in the example,
    - the first Adaptation Set describes the video of the content in the MPEG4 coding format and at standard resolution (SD) at 1 Mbit/s and 720p resolution at 3.2 Mbits/s.
    - the second describes the video in the HEVC coding format and at HD resolution (1080p) at 10 Mbit/s.
- BaseURL indicates an address for accessing the content via a URL (Uniform Resource Locator), at different levels of the hierarchy of the MPD file. In the example, these tags indicate, respectively, the address of the content server 3 (http://server.com), then the address of the flows encoded in MPEG4 format (video/h264) and/or HEVC format (video/h265);
- SegmentList lists the complementary parts of the addresses of the various fragments:
    - "C_SD_1000k_h264_1.m4s" for the first fragment of the content "C" at 1000 kilobits per second ("kb"), in 640×480 (SD) format
    - "C_SD_1000k_h264_2.m4s" for the second fragment, etc.

When it has these fragment addresses, the terminal may proceed to obtain the multimedia content fragments by downloading at these addresses. For example, the compound address corresponding to the content C at the lowest resolution and speed is of the MPEG4 type at the address:
http://server.com/video/h264/C_SD_1000k_h264(_X) .m4s.

According to this example, the generation of the addresses takes place on the electronic device itself; naturally, this variant assumes that the processing device has sufficient hardware and software means available to access the manifest file, analyse it and generate the correct address corresponding to the command received.

According to this embodiment, the MPD file also includes supplementary tags in a Comp/ex structure, indicating the complexity of a content to be processed:
- level indicates the level of complexity linked with the processing of a content, on a sliding scale from 1 to 10 for example. This indication makes it easier for the device according to the invention to select a content in the MPD file, notably in the case of resources with limited power supply: if it only has a USB power supply, a content with a complexity of 8 (high) may be unsuitable. In this case, the device must switch to a content having lower complexity.
- % Batt indicates the percentage battery charge required to render the content in this quality, using a number on a sliding scale from 0 to 100 for example, or alternatively a required duration; this indication makes it easier for the device according to the invention to select a content in the MPD file, notably in the case of resources having a limited power supply duration: if the battery is only 50% charged (or has only an hour of charge remaining), a content denoted "60%" (requiring 1 hour 30 minutes of remaining charge) may be unsuitable. In this case, the device must switch to a content having lower complexity and/or a lower charge percentage requirement.

Naturally, these new fields are mentioned purely by way of indication, and numerous other possibilities are open to those skilled in the art. These fields may be filled in by the device when the MPD file is obtained, or later on in the course of operation, or may be entered by the service gateway which knows the processing device and its capacity, etc.

According to the invention, a "Power supply file", abbreviated to FA (2), has been installed on the device in advance. The management module is capable of retrieving the characteristics of the power supply associated with the terminal (type of power supply, volume of charge, state, etc.), entering them in such a file, and then, depending on the characteristics entered, conditionally accepting or rejecting the service at a given instant, by a method which is described below with reference to FIG. 3.

Figure 2:
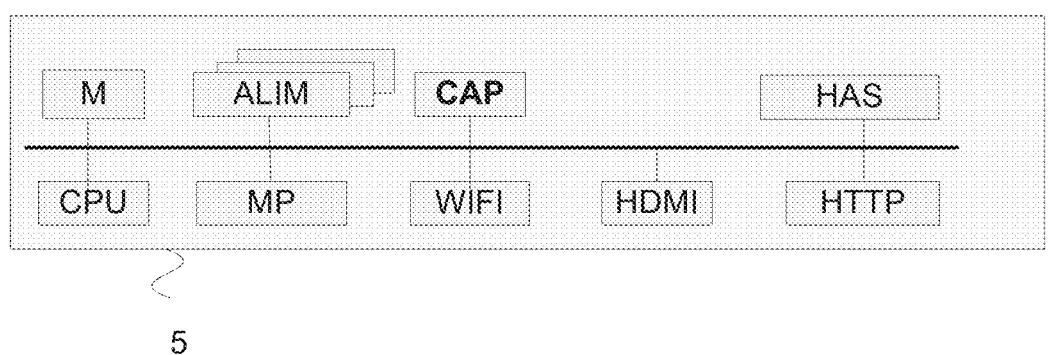
FIG. 2 shows a hardware architecture of such a device according to an embodiment of the invention.

FIG. 2 shows a hardware architecture of a processing device according to an embodiment of the invention.

The device comprises memories M arranged around a processor CPU. It communicates with the network (1) via the communication module (HTTP) which enables it to connect to the content server. It also includes:
- one or more power supply modules ALIM (battery, USB, mains, etc.)
- an interface module (HDMI) capable of physically and logically interfacing with the television (7) for transmission of the decoded multimedia content (audio and video) and exchanging basic commands (silent mode, volume increase, volume reduction, etc.)
- a communication module (WiFi) enabling it to connect preferably in a wireless manner (for example, but not exclusively, via a WiFi radio channel) to the terminals of the network, for example a mobile terminal from which it receives the commands for downloading content and exchanging messages with the user
- a media player (MP) capable of rendering (receiving, decoding and preparing) the flows in streaming mode and delivering them to the display device; the media player includes, among other elements, a set of decoders (audio, video, etc.) capable of decoding the multimedia content
- an adaptive streaming management module (HAS) capable of making use of the information contained in the description files in order to request the progressive downloading of a content having one of the qualities offered in the description file.
- a capacity management module (CAP) according to the invention, responsible for managing the power supply capacity according to the embodiment described above with reference to FIG. 1. This module is, notably, capable, in relation to the embodiments of the invention, of:
- analysing the request for a content, received for example from a terminal belonging to the user, and extracting from it one or more possible qualities of the requested content, on the basis of other criteria such as the resolution of the connected screen, the available bandwidth, etc.
- comparing the desired quality with the actual capacity of the device in terms of power supply;
- if the capacity of the device is insufficient, changing the quality of the content;
- transmitting a request to the HAS module to stream a content having the calculated new quality;
- optionally, preparing a warning or information message to be sent to the user.

Figure 3:
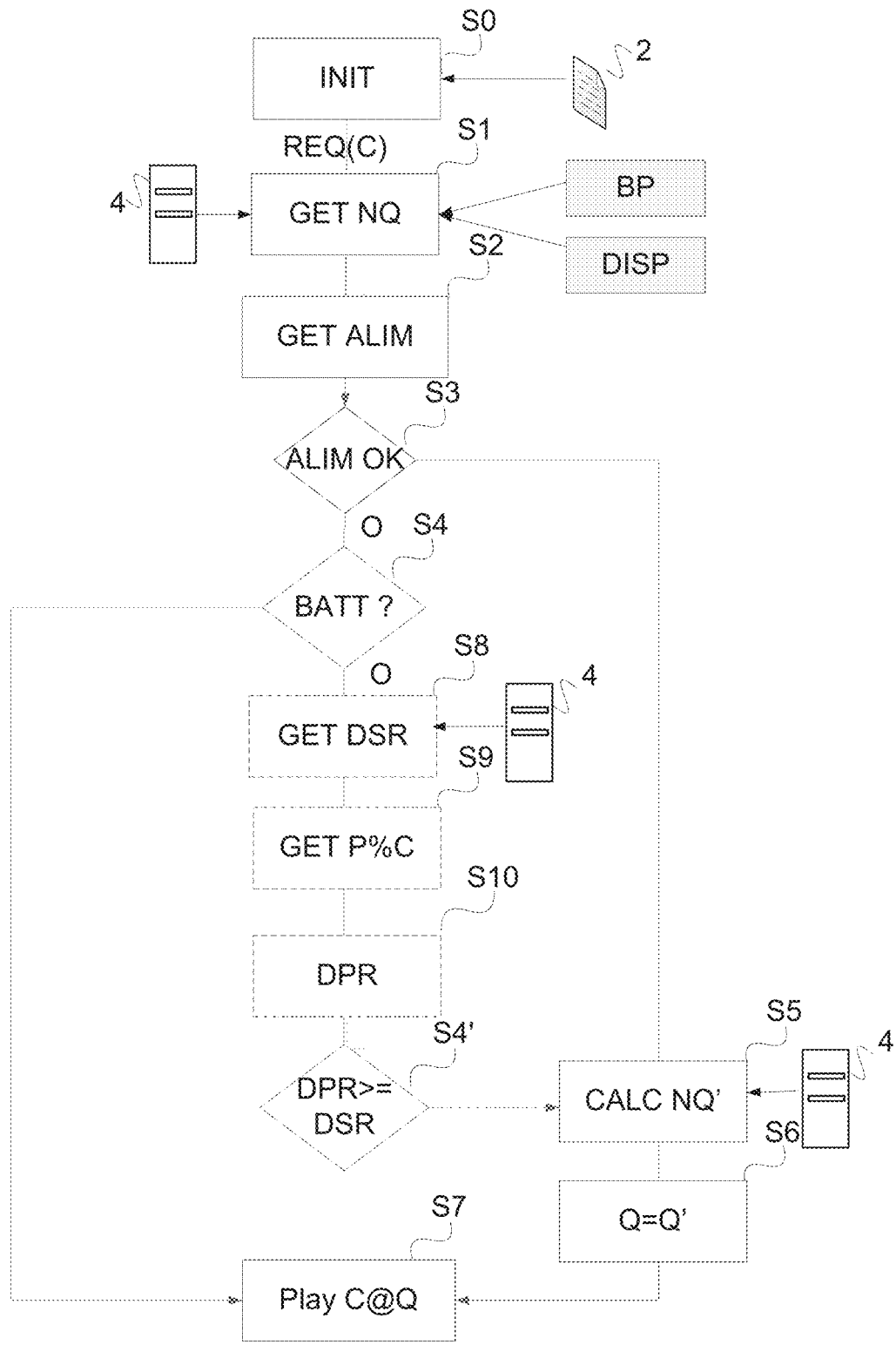
FIG. 3 shows an algorithm for adjusting the quality parameters of the content on the basis of the power supply state of the device, according to an embodiment of the invention.

FIG. 3 shows a flow diagram of the method according to an embodiment of the invention.

In a step S0, the processing device, which in our example is a multimedia decoder, is initialized; in this example embodiment, its power supply capacity is predefined in a power supply file (FA), installed in the memory of the device. It may be storage in ROM, EPROM, or other memory.

An example of content from a table of such a file, located in the memory of the device, is shown below (Table 1); this includes:
- the identifier of the decoder;
- a "MEDIA" column indicating the type of medium/media of a content, the type of coding (for example MPEG4) and the resolution (for example, SD) supported, and a range of associated speeds (1 Mbit/s to 3 Mbit/s); one or more of these parameters indicates a quality of the content. In the following text, the quality is denoted Q=MPEG4@SD to indicate an MPEG4 quality in SD resolution (the speed is not taken into account, for the sake of simplicity);
- an "ALIM" column, including the possible power supply modes for processing a given content quality. Here, the possible power supply modes are battery (BATT), serial (USB) or mains (SEC);
- optionally, in an embodiment based on the use of the battery, a P % C column indicating the required percentage of charge of the battery for processing a content of predefined duration. Line 3 indicates, for example, that the battery must be charged to at least 15% in order to render an MPEG4@SD content (for one hour) if the device is running on the battery; this column could be replaced by a "complexity" column which would indicate the complexity of the content to be processed, on a scale from 1 to 10 for example, according to the quality, coding type, etc., of the content.

TABLE 1 example of a table of the power supply file (FA) of the device
- ID_C = "decoder 666777"

| | MEDIA | | | |
|---|---|---|---|---|
| Media | coding | Speed (R) | ALIM | P % C |
| video | MPEG4@SD | 1-3 Mbit/s | BATT, USB, SEC | 15% |
| | MPEG4@HD | 3-8 Mbit/s | BATT, USB, SEC | 60% |
| | HEVC@HD | 4-12 Mbit/s | BATT, SEC | 90% |
| | HEVC@4K | 10-25 Mbit/s | SEC | — |
| | HEVC@3D | 8-20 Mbit/s | SEC | — |
| audio | MP3 | 128 kb/s | BATT, USB, SEC | 5% |
| | AC3 | 384 kb/s | USB, SEC | — |

It is assumed that the processing device (notably via its module (HAS)) has at its input, or can access on request:
- the display characteristics of the television to which it is connected (spatial and frequency resolution, formats supported, etc.);
- the manifest file (MPD) describing the required content and the associated levels, according to Appendix 1 for example; the file may be transmitted to it, for example, via the content server (3), or via the home gateway (or via another terminal of the local network, etc.
- the network access speed, or bandwidth (BP). It may, notably, receive this information from the service gateway to which it is connected, or may calculate the bandwidth on the basis of the speed already assigned to the downloaded content being viewed by the user, or may obtain it by any other method within the competence of those skilled in the art (value of the mean download speed during a number of previously executed downloads, or the immediate speed measured at the end of the downloading of the last file, or any other combination of the download times stored by the terminal during its previous downloads, etc.).

In a first step S1, the device receives a request from a user, sent from his smartphone for example. The request includes the identifier of the content C that the user wishes to view. As it knows the available bandwidth, the device calculates, while allowing for the resolution of the television (screen size, resolution, etc.), the quality level of the content C to be processed. It should be noted that the content may be downloaded first, using the slowest speed, notably if it is desirable for the rendering to start before the end of the steps of the algorithm. In an example, the user wishes to obtain rendering of the content C in high definition (HD). Looking at the MDP file shown in Appendix 1, we see that he must therefore download the content with the quality of Q=HEVC@1080p and the speed of 10 Mbits/s at the following address:

http://server.com/video/h265/C_1080p_10000k_h265 (_X).m4s.

A test, not shown, may consist in checking that the screen specified for the rendering can support the required resolution. If this is not the case, another quality level may be chosen, for example the level corresponding to the content C in MPEG4 in 720p at 3.2 Mbps (MPEG4@720p). However, such a test lies outside the context of the invention.

In a step S2, the module CAP of the device acquires the current power supply type, which in our example is battery (BATT), serial (USB) or mains (SEC). Step S2 is followed by a testing step S3, in which the current power supply type is compared with the quality desired for the content; that is to say, a matching test is conducted between the quality of the content, and therefore the energy required for its decoding, and the power supply source. To conduct this test, the module CAP reads the power supply file FA. For example, it accesses Table 1, shown above. To decode a content C in HD at this speed and in H265, it must have a battery or mains power supply (see row 6 of Table 1).

If it is supplied by a serial connection USB, the test in step 3 is negative, and is followed by step S5 in which a new quality level NQ' is calculated for the content. According to the preceding example, the content C may be downloaded at all the levels which allow a USB power supply: that is to say, according to lines 4 and 5 of Table 1: in MPEG4@SD or HD. In this case, since the user has requested HD resolution, it is the MPEG4@HD (720p) that is chosen, and the new quality is assigned to the content in step S6 (Q=Q'=MPEG4@HD) before the downloading of step S7 according to the new quality that was assigned in step E6 (Q'=Q).

A test, conducted in step S4 after step S3 if the latter indicates that the power supply is appropriate, consists in testing whether the device is being powered by the battery. In the example, therefore, there are two possible cases:
- either the device is on mains power, in which case, the test of step S4 being negative, (it is not on battery power) step S4 is followed by step S7, in which the content is downloaded, decoded and rendered with the required quality level (NQ), that is to say with a quality of HEVC@1080p at the address:
http://server.com/video/h265/C_1080p_10000k_h265 (_X).m4s or it is on battery power, in which case steps S8, S9, S10 AND S'4 are executed to calculate a duration of content to be rendered and adapt the quality of the content to the (remaining) charge of the battery.

In step S8, the actual duration of the content is obtained; this can be read in the description file 4, for example in the <Period duration="PT1H12M14.16S"> field of the MPD (according to this example, the duration of the content is 1 hour, 12 minutes, 14.16 seconds); alternatively, it may be supplied by the user via his terminal connected to the decoder (he may indicate thereto, for example, that he would like to view one hour of content).

In step S9, a percentage P % C of residual charge of the battery is obtained by the module CAP. This information may be obtained by any means within the competence of those skilled in the art. For example, the battery is charged to 50% at the moment of the test (P % C=50).

In step S9, a possible duration of rendering DPR, using the battery charge, is calculated. For example, if the content has to be downloaded in the quality Q=HEVC@HD, the last column of Table 1 shows that the battery must be 90% charged to render one hour of content on average. Since the required content has a duration of 1 hour and 12 minutes, the battery charge (50%) is insufficient. The test in step S4' is failed, because the possible duration of rendering is greater than the required duration. A new quality level must be calculated in step S5, as described above, using the MDP and the power supply file (FA, 2). For example, since the quality MPEG4@SD may be provided with a battery charge of 15% for one hour, it is simple to deduce therefrom, using a rule of proportionality, that the battery must be charged to approximately 20% in order to render the content C of 1 hour and 12 minutes. Thus the current charge of the battery is sufficient for this quality. The quality Q'=MPEG4@SD may therefore be downloaded in step S7.

According to variants, a complexity level or a battery charge indication may be entered, at the end of this step, either in the manifest file (Appendix 1, Complex tag), or in the file FA (Table 1, last column).

Evidently, the embodiment described above has been given purely for by way of indication and in a non-limiting way, and numerous modifications may easily be made by those skilled in the art without thereby departing from the scope of the invention.

APPENDIX 1

| example of a simplified MPEG-DASH manifest file |
| --- |

```xml
<?xml version="1.0"?>
<MPD xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011 DASH-MPD.xsd"
 type="dynamic" profiles="urn:mpeg:dash:profile:isoff-live:2011">
<BaseURL>HTTP://server.com/</BaseURL>
<!--duration of the content -->
<Period duration="PT1H12M14.167S">
    <!-- video of content C in MPEG4-->
    <AdaptationSet lang="eng" par="16:9" maxFrameRate="24" maxHeight="1080" maxWidth="1920"
     group="1" id="1">
        <!--base URL for MPG4 content-->
        <BaseURL>video/h264/</BaseURL>
        <!-- Content C in SD at 1 Mbps-->
        <Representation id="SD" codecs="avc1" mimeType="video/mp4"
         width="800 " height="600" startWithSAP="1" bandwidth="1000000">
            < SegmentList duration="10">
                <SegmentURL media="C_SD_1000k_h264_1.m4s"/>
                <SegmentURL media="C_SD_1000k_h264_2.m4s"/>
                ....
                < Complex level="2" %Batt="10">
            </ SegmentList >
        </Representation>
        <!-- Content C in 720p at 3.2 Mbps -->
        <Representation id="720p" codecs="avc1" mimeType="video/mp4"
         width="1280" height="720" bandwidth="3200000">
            <SegmentList duration="10">
                <SegmentURL media="C_720p_3200k_h264_1.m4s"/>
                ....
            </SegmentList>
        </Representation>
    </AdaptationSet>
    <!-- video of content C in HEVC-->
    <AdaptationSet lang="eng" par="16:9" maxFrameRate="24" maxHeight="1080" maxWidth="1920"
     group="1" id="1">
        <!--base URL for HEVC content-->
        <BaseURL>video/h265/</BaseURL>
        <Representation id="3" codecs=" hev1.1.6" mimeType="video/mp4"
         frameRate="24" width="1920" height="1080" bandwidth="10000000">
            <!-- Content C at high speed -->
```

APPENDIX 1-continued example of a simplified MPEG-DASH manifest file

```
            < SegmentList duration="10">
                <SegmentURL media="C_1080p_10000k_h265_1.m4s"/>
                <SegmentURL media="C_1080p_10000k_h265_2.m4s"/>
            ....
            < Complex level="8">
            </ SegmentList >
        </AdaptationSet>
    <!— audio of content C -->
</MPD>
```

The invention claimed is:

1. A method comprising:

automatically managing electricity consumption of a processing device for processing multimedia content, the processing device being powered by a power supply, said automatically managing comprising executing the following acts on the processing device:

upon receiving a request for progressively downloading a multimedia content encoded with at least two quality levels, said encoding quality levels being described in a downloadable description file of the multimedia content, said request comprising a requested rendering quality of said multimedia content:

downloading said description file;

requesting a progressive download of at least one fragment of said multimedia content in a first of said at least two encoding quality levels:

based upon a match between said requested rendering quality of the multimedia content and said at least two encoding quality levels when said power supply is a mains power supply, and based upon a match between said requested rendering quality and said at least two encoding quality levels and upon a match between energy required for said processing device for processing said at least one fragment with said at least two encoding quality levels and available energy of said power supply when said power supply is a power supply of limited energy; and processing the multimedia content to render the at least one fragment of the multimedia content in said first quality level.

2. The method according to claim 1, wherein the power supply has a finite power supplying duration, and the method also includes:

checking a match between said requested rendering quality of the multimedia content and a power supply state of the processing device.

3. The method according to claim 1, wherein the supply is of limited energy, further having a finite power supplying duration, and the method includes the following acts executed on the processing device:

obtaining a desired duration of rendering of the multimedia content;

obtaining a possible duration of rendering on the basis of a residual charge of the power supply and the requested rendering quality of the multimedia content;

and wherein:

said first quality level is selected in such a way that the possible duration of rendering is at least equal to the desired duration of rendering.

4. The method according to claim 1, wherein the requested rendering quality of the multimedia content is linked to a characteristic of coding, of speed or of resolution.

5. The method according to claim 1, further including entering a level of complexity into said downloaded description file, said first quality level being further selected as a basis of said entered complexity level.

6. The method according to claim 1, further including entering a duration of charge into said downloaded description file, said first quality level being further selected as a basis of said entered duration of charge.

7. The method according to claim 1, wherein the match between the energy required for said processing device for processing said at least one fragment with said at least two encoding quality levels and the available energy of said power supply when said power supply is limited energy is checked by reading a data structure representative of the power supply requirements of the processing device for said at least one required content quality.

8. A processing device capable of processing multimedia content, the processing device being powered by a power supply, the processing device including:

a processor; and a non-transitory computer-readable medium comprising instructions stored thereon, which when executed by the processor configure the processing device to automatically manage electricity consumption of said processing device for processing multimedia content, upon receiving a request for progressive downloading a multimedia content encoded with at least two quality levels, said encoding quality levels being described in a downloadable description file of the multimedia content, said request comprising a requested rendering quality of said multimedia content, by:

downloading said description file;

requesting a progressive download of at least one fragment of said multimedia content in a first of said at least two encoding quality levels:

based upon a match between said at least one requested rendering quality of the multimedia content and said at least two encoding quality levels when said power supply is a mains power supply, and based upon a match between said requested rendering quality and said at least two encoding quality levels and upon a match between energy required for said processing device for processing said at least one fragment with said at least two encoding quality levels and available energy of said power supply when said power supply is a power supply of limited energy; and processing the multimedia content to render the at least one fragment of the multimedia content in said first quality level.

9. A digital decoder comprising the processing device according to claim 8.

10. A non-transitory computer-readable medium comprising a computer program stored thereon comprising code instructions for implementing a method of automatically managing electricity consumption of a processing device for processing multimedia content, when the instructions are executed by a processor of the processing device, the processing device being powered by a power supply, wherein the instructions configure the processing device to:

upon receiving a request for progressively downloading a multimedia content encoded with at least two quality levels, said encoding quality levels being described in a downloadable description file of the multimedia content, said request comprising a rendering quality of said multimedia content, execute acts comprising:

downloading said description file;

requesting a progressive download of at least one fragment of said multimedia content in a first of said at least two encoding quality levels:

based upon a match between said requested rendering quality of the multimedia content and said at least two encoding quality levels when said power supply is a mains power supply, and based upon a match between said requested rendering quality and said at least two encoding quality levels and upon a match between energy required for said processing device for processing said at least one fragment with said at least two encoding quality levels and available energy of said power supply when said power supply is a power supply of limited energy; and processing the multimedia content to render the at least one fragment of the multimedia content in said first quality level.

11. The method according to claim 1 wherein the power supply belongs to a group consisting of:
the mains power supply;
a battery power supply;
a serial power supply.

12. The processing device of claim 8, wherein the power supply has a finite power supplying duration, and said instructions, when executed by the processor, configure the processing device to:

check a match between said requested rendering quality of the multimedia content and a power supply state of the processing device.

13. The processing device of claim 8, wherein the power supply is of limited energy, further having a finite power supplying duration, and said instructions, when executed by the processor, configure the processing device to obtain a desired duration of rendering of the multimedia content;

obtain a possible duration of rendering on the basis of a residual charge of the power supply and the requested rendering quality of the multimedia content;

and wherein said first quality level is selected in such a way that the possible duration of rendering is at least equal to the desired duration of rendering.

14. The processing device of claim 8, wherein the requested rendering quality of the multimedia content is linked to a characteristic of coding, of speed or of resolution.

15. The processing device of claim 8, wherein said instructions, when executed by the processor, configure the processing device to enter a level of complexity into said downloaded description file, said first quality level being further selected as a basis of said entered complexity level.

16. The processing device of claim 8, wherein said instructions, when executed by the processor, configure the processing device to enter a duration of charge into said downloaded description file, said first quality level being further selected as a basis of said entered duration of charge.

17. The processing device of claim 8, wherein said instructions, when executed by the processor, configure the processing device to check the match between the energy required for said processing device for processing said at least one fragment with said at least two encoding quality levels and the available energy of said power supply when said power supply is of limited energy by reading a data structure representative of the power supply requirements of the processing device for said at least one required content quality.

18. The processing device of claim 8, wherein the power supply belongs to a group consisting of:
the mains power supply;
a battery power supply;
a serial power supply.

* * * * *

UNITED STATES PATENT AND TRADEMARK OFFICE
CERTIFICATE OF CORRECTION

PATENT NO. : 11,252,471 B2
APPLICATION NO. : 16/209189
DATED : February 15, 2022
INVENTOR(S) : Jean-Bernard Leduby et al.

It is certified that error appears in the above-identified patent and that said Letters Patent is hereby corrected as shown below:

On the Title Page

In Item (71), the Applicant's city, please delete "Paris" and insert --Issy-les-Moulineaux--

In Item (73), the Assignee's country, please delete "CN" and insert --FR--

Signed and Sealed this
Twenty-sixth Day of April, 2022

Katherine Kelly Vidal
*Director of the United States Patent and Trademark Office*